Patented Aug. 25, 1931

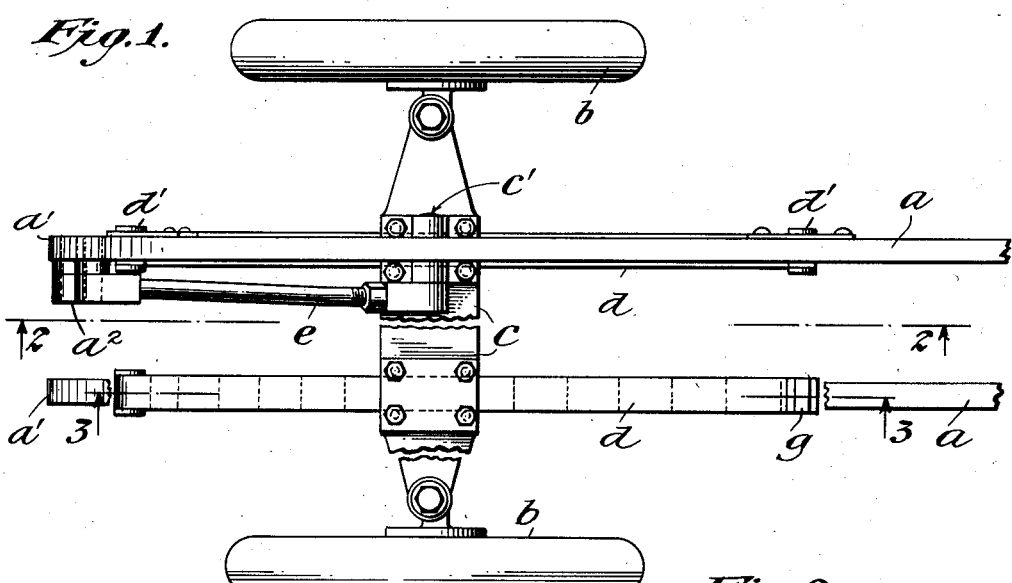
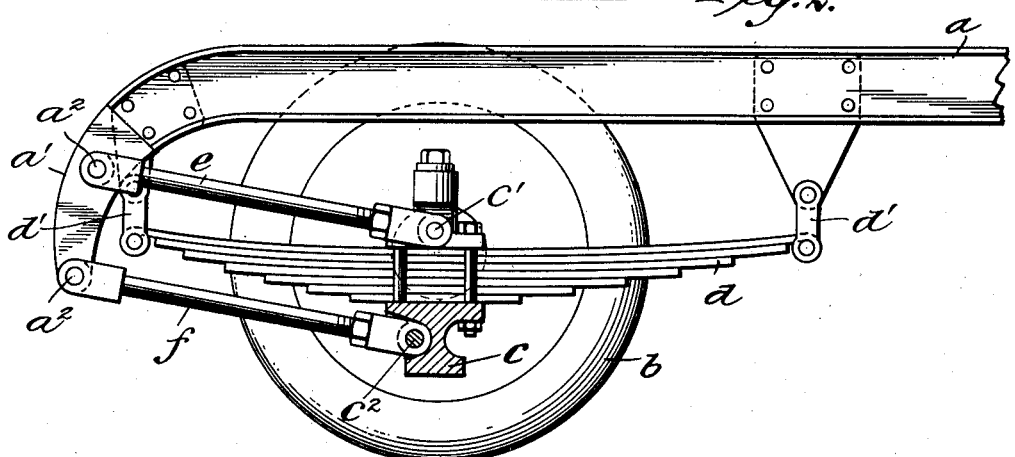
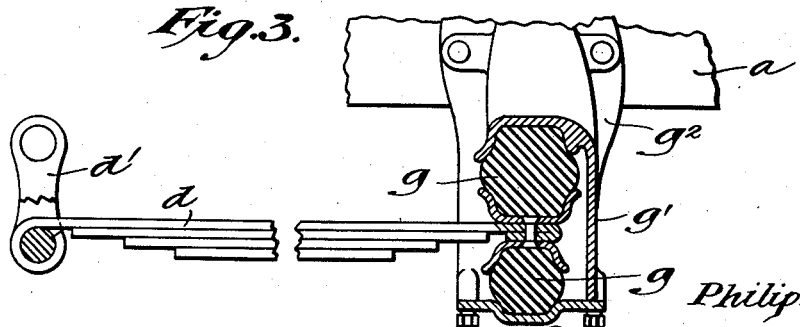

1,820,753

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

FRONT AXLE STABILIZING DEVICE

Appilcation filed November 1, 1929. Serial No. 403,934.

The present invention relates to front axle mountings and embodies, more specifically, an improved form of mounting in which the front axle is carried by a spring which assumes all of the load transmitted to the axle, the axle being so secured as to insure proper stabilization thereof regardless of the driving conditions.

For the proper and safe steering of an automotive vehicle it is important that the knuckle pivot pins of the front axle be mounted so that they have a rearward pitch or caster angle. This gives the front wheels a trailing position so that, when driving, they tend to asume a straight forward position at all times. The degree of this caster angle is of great importance. If an extreme angle, for instance, five degrees is used, it will be found that the steering effort is considerably increased when turning a corner. This is highly undesirable and therefore results in the utilization of a smaller caster angle.

In using a minimum angle of 1 degree, with center point steering, the steering effort, when turning a corner, is greatly reduced. Under these conditions, it is extremely difficult to maintain the angle on a moving vehicle due to the conventional type of front axle suspension where the front axle is connected by means of the springs to the chassis. This flexible connection will permit the axle to rotate about its axis when the car strikes an obstacle in the road or when the front wheel brakes are applied. It will be readily seen that only a slight amount of twisting is required to nullify the small caster angle and actually at times, the axle rotates to such an extent that a negative caster angle results, such condition, of course, is utterly ruinous to any steering control and will cause the car to be very difficult to steer. This condition is particularly objectionable when making an extreme left or right turn at a fairly high speed where the negative caster requires considerable additional effort to return the steering wheel to its straight forward position. Against the above conditions, the condition resulting from an extreme caster angle is to be considered, such extreme angle resulting in a very annoying low speed shimmy on certain cars. It will therefore be seen that there is great need for a device which permits the use of a minimum caster angle which is retained at a definite degree regardless of the conditions of operation.

An object of the invention, accordingly, is to provide a device which stabilizes the front axle of a motor vehicle.

A further object of the invention is to provide a device which maintains a definite caster angle, or cant, of the front axle.

A further object of the invention is to provide a device for maintaining, positively, a minimum caster angle for the steering wheels of a motor vehicle.

Further objects, not specifically enumerated above, will be apparent as the invention is described in greater detail in connection with the accompanying drawings, wherein:

Figure 1 is a plan view, parts thereof being broken away and moved together, showing a preferred form of the invention.

Figure 2 is a view in section, taken on line 2—2 of Figure 1, and looking in the direction of the arrows.

Figure 3 is a view in section, taken on line 3—3 of Figure 1, and looking in the direction of the arrows.

Referring to the above drawings, the side frame members of a motor vehicle are indicated at $a$. The front steering wheels carried thereby are shown at $b$ and are mounted upon a front axle $c$ in the usual manner. Springs $d$ mount the axle upon the frame through suitable shackle connections $d'$ at either ends thereof.

The goose neck or horn $a'$ of the chassis frame is provided with stub shafts $a^2$ upon which radius rods $e$ and $f$ are journaled. The specific connections of such rods to the frame forms no part of the present invention, it being apparent that any well known form of connection may be utilized. The distant ends of the radius rods $e$ and $f$ are pivotally mounted upon the axle $c$ at $c'$ and $c^2$, respectively. The effective lengths of these rods are equal and the rods are so disposed that the axes thereof are parallel. By mounting the rods in this manner true parallel motion will result between the rods and the cant, or caster angle of the front axle, will be maintained in a fixed relation to the vertical axis.

It is to be noted that the radius rod connections are applied to only one side of the axle, preferably the right hand side. The spring on this side is shackled on both ends, whereas the left hand spring is preferably shackled on the front end only, the rear end being held in position by suitable rubber blocks $g$ carried in a housing $g'$ formed upon a bracket $g^2$ which is mounted upon the frame. The above mounting tends to eliminate front axle shimmy since the different mountings of the two front springs will tend to dampen out any uniform vibration of the axle.

It will be seen that a similar result will be attained by using rubber connections on all four spring ends. It will further be apparent that the radius rods may be mounted rearwardly of the axle, the connection being with the frame adjacent the rear shackle of one of the front springs. This would, of course, be theoretically more correct as the arcs described by the radius rods would correspond more closely with the arc of the drag link, thus preventing severe deflections of the front spring from having any appreciable effect upon the steering. The construction described, however, gives better riding qualities and will be found to be highly effective in operation. By mounting the radius rods at only one side of the frame, in conjunction with the described spring mounting, front axle shimmy will be practically eliminated and the parallel radius rods will prevent the axle from rotating, thus maintaining the caster angle of the front axle at a desired amount under all conditions.

While the invention has been described with specific reference to the accompanying drawings, it is not to be limited, save as defined in the appended claims.

I claim as my invention:

In combination with a vehicle frame and front axle, springs for mounting the axle on the frame, means mounting one of the springs on the frame to permit a degree of floating thereof with respect to the frame, means to mount the other spring on the frame to eliminate, substantially, floating movement of the spring, and parallel radius rods spacing the floating end of the axle from one point of the frame and maintaining it at a desired angle with respect thereto.

This specification signed this 28th day of October A. D. 1929.

PHILIP E. MATTHEWS.